United States Patent
Löhken et al.

(10) Patent No.: US 9,920,563 B2
(45) Date of Patent: Mar. 20, 2018

(54) DAMPING ASSEMBLY, IN PARTICULAR FOR A FLAP OF A VEHICLE

(71) Applicant: Stabilus GmbH, Koblenz (DE)

(72) Inventors: Lars Löhken, Bonn (DE); Ulrich Probst, Hillscheid (DE); Michael Hewel, Boppard (DE)

(73) Assignee: Stabilus GmbH, Koblenz (DE)

( * ) Notice: Subject to any disclaimer, the term of this patent is extended or adjusted under 35 U.S.C. 154(b) by 39 days.

(21) Appl. No.: 15/006,548

(22) Filed: Jan. 26, 2016

(65) Prior Publication Data

US 2016/0215552 A1   Jul. 28, 2016

(30) Foreign Application Priority Data

Jan. 28, 2015  (DE) .................. 10 2015 201 474

(51) Int. Cl.
| | |
|---|---|
| *E05F 5/02* | (2006.01) |
| *F16F 9/48* | (2006.01) |
| *F16F 9/512* | (2006.01) |
| *F16F 9/32* | (2006.01) |

(52) U.S. Cl.
CPC .............. *E05F 5/02* (2013.01); *F16F 9/3221* (2013.01); *F16F 9/483* (2013.01); *F16F 9/512* (2013.01); *E05F 5/025* (2013.01)

(58) Field of Classification Search
CPC . E05F 5/02; E05F 5/025; F16F 9/3221; F16F 9/483; F16F 9/512; F16F 9/49
USPC ..... 188/280, 282.1, 282.5, 284, 288, 322.15
See application file for complete search history.

(56) References Cited

U.S. PATENT DOCUMENTS

| | | | | |
|---|---|---|---|---|
| 3,797,615 A | * | 3/1974 | Stembridge ............. | B60R 19/32 188/285 |
| 4,474,271 A | * | 10/1984 | Molders ................. | B61K 7/025 188/280 |
| 4,595,182 A | | 6/1986 | Freitag et al. | |

(Continued)

FOREIGN PATENT DOCUMENTS

| | | |
|---|---|---|
| DE | 3301544 | 7/1984 |
| DE | 19604721 | 8/1996 |

(Continued)

OTHER PUBLICATIONS

Search Report of DE Application No. 10 2015 201 474.6 dated Dec. 1, 2015, 10 pages.

(Continued)

*Primary Examiner* — Thomas J Williams
*Assistant Examiner* — Mariano Sy
(74) *Attorney, Agent, or Firm* — Rankin, Hill & Clark LLP

(57) ABSTRACT

A damping unit includes a cylinder which is filled with a damping fluid and in which a piston rod is guided, the piston rod associated with a bottom surface which has at least one axial through-hole which defines an effective flow cross section for the damping fluid; wherein the piston rod includes: a sleeve element which is fixed on the piston rod in the axial direction; a piston bottom element which is supported on the piston rod so as to be axially slidable and includes the bottom surface; a resilient element; and a termination element which is fixed on the piston rod in the axial direction and forms an indirect or direct stop for the piston bottom element in the insertion direction of the piston rod.

14 Claims, 3 Drawing Sheets

(56) References Cited

U.S. PATENT DOCUMENTS

| | | | | |
|---|---|---|---|---|
| 5,102,109 | A * | 4/1992 | Schnetz | F16F 9/512 188/282.1 |
| 5,579,874 | A | 12/1996 | Jeffries et al. | |
| 5,730,260 | A * | 3/1998 | Thyssen | B61K 7/025 188/266.5 |
| 6,007,057 | A * | 12/1999 | Fuhrmann | E05F 3/02 188/282.1 |
| 6,129,343 | A * | 10/2000 | Ecarnot | F16F 9/3405 188/281 |
| 6,913,128 | B2 * | 7/2005 | Muller | F16F 9/516 188/280 |
| 8,919,505 | B2 * | 12/2014 | Slusarczyk | F16F 9/3485 188/282.5 |
| 2005/0269176 | A1 | 12/2005 | Tomiji et al. | |
| 2007/0114103 | A1 * | 5/2007 | Born | F16F 9/0218 188/284 |
| 2008/0121478 | A1 * | 5/2008 | Maniowski | F16F 9/512 188/282.6 |
| 2009/0090587 | A1 | 4/2009 | Tomita | |
| 2011/0024248 | A1 | 2/2011 | Zimmer et al. | |
| 2017/0067279 | A1 * | 3/2017 | Koestler | E05F 5/022 |

FOREIGN PATENT DOCUMENTS

| | | |
|---|---|---|
| DE | 19649836 | 6/1998 |
| DE | 202005021470 | 3/2008 |
| DE | 102008010908 | 9/2009 |
| EP | 1215414 | 6/2002 |
| EP | 2233775 | 9/2010 |

OTHER PUBLICATIONS

European Search Report of EP Application No. 16 152 983.9 dated Sep. 5, 2016, 6 pages.

Extended European Search Report of EP Application No. 16 152 983.9 dated Dec. 12, 2016, 13 pages.

* cited by examiner

DAMPING ASSEMBLY, IN PARTICULAR FOR A FLAP OF A VEHICLE

The present invention relates to a damping unit comprising a cylinder which is filled with a damping fluid, preferably a hydraulic fluid, in which cylinder a piston rod is guided in an axial direction of the cylinder so as to be able to be inserted and withdrawn, the piston rod being associated with a bottom surface which extends between the piston rod and an inside wall of the cylinder and has at least one axial through-hole which defines an effective flow cross section for damping fluid. The invention further relates to a damping assembly for a flap of a motor vehicle, and to a flap assembly of a vehicle having a damping assembly of this kind.

Hydraulic damping units of this kind are known from the prior art, the damping behaviour of which units changes depending on the speed at which the piston is inserted into the cylinder. In this case, the piston surface area provided on the piston rod divides the interior of the cylinder into two spatial regions, between which the damping fluid can flow in a predefined manner.

In particular, there are a plurality of conceivable uses for hydraulic dampers which have a greater damping force at an insertion speed which is above a specified threshold value, i.e. inhibit the insertion movement of the piston into the cylinder more significantly than when below the predetermined insertion speed. However, hydraulic dampers of this kind have, up to now, been relatively complex in terms of construction and therefore laborious and expensive to produce, as well as being liable to faults.

Against the background of this problem, an object of the present invention is that of providing a damping unit in which the desired insertion speed-dependent characteristic can be achieved using simple structural means, and which is therefore simple and cost-effective to produce as well as being robust.

According to a first aspect of the invention, the stated object is achieved by a damping unit comprising a cylinder filled with a damping fluid, in which cylinder a piston rod is guided in an axial direction of the cylinder so as to be able to be inserted and withdrawn, the piston rod being associated with a bottom surface which extends between the piston rod and an inside wall of the cylinder and has at least one axial through-hole which defines an effective flow cross section for damping fluid, wherein the piston rod comprises, at the front end thereof in the insertion direction into the cylinder, a stop which is fixed on the piston rod in the axial direction and defines a front face in the insertion direction of the piston rod, a piston bottom element which is supported on the piston rod so as to be axially slidable and comprises the bottom surface; a resilient element, preferably a spiral spring, which prestresses the piston bottom element relative to the piston rod in such a way that, in an idle state of the piston rod, the bottom surface of the piston bottom element and the front face of the stop are spaced apart from each other by means of the effect of the resilient element, and the resilient element being designed such that, above a predefined insertion speed of the piston rod into the cylinder, the dynamic pressure of the damping fluid causes the bottom surface of the piston bottom element to come into contact with the front face of the stop against the effect of the resilient element, the effective flow cross section for the damping fluid being reduced due to the interaction of the front face of the stop and the at least one axial through-hole in the bottom surface of the piston bottom element.

The damping unit according to the invention makes it possible to achieve the desired damping characteristics by means of providing merely one axially slidable element, provided on the piston rod. In this manner it is possible, using the simplest means, to provide a damping unit which has the desired damping characteristics, i.e. has a first damping force below a predetermined insertion speed and has a second damping force above the predetermined insertion speed, which second damping force is greater than the first damping force.

In a preferred embodiment, the stop can be formed by a sleeve element which has a casing which extends substantially in the axial direction, is spaced apart from the piston rod, and is open in the insertion direction of the piston rod, such that a chamber is formed between the piston rod and the casing, and the front face of the stop being defined on the open end of the casing in the insertion direction of the piston rod, the resilient element being received in the chamber formed between the piston rod and the sleeve element at least in part so as to be supported on the sleeve element at one end and on the piston bottom element at the other end. A sleeve element of this kind makes it possible for a resiliently compressible element to be used as the resilient element, which element acts axially between the piston bottom element and the sleeve element, even if the piston bottom element strikes the sleeve element.

In a preferred embodiment, the piston bottom element can be associated with a sealing element which produces a seal between the piston bottom element and the inside wall of the cylinder. Providing the sealing element makes it possible to prevent damping fluid from being able to penetrate between the piston bottom element and the inside wall of the cylinder, which ensures precise adjustment of the damping properties of the damping unit since, in this manner, only the at least one axial through-hole in the bottom surface permits damping fluid to flow between the two spatial regions of the cylinder separated by the bottom surface.

In a possible embodiment, the sealing element can be formed integrally with the piston bottom element or rigidly connected thereto, for example glued to the piston bottom element. Moreover, it is also conceivable to form the sealing element separately from the piston bottom element, it being possible, in an embodiment of this kind, for the sealing element to be received between the piston bottom element and a retaining element, it being possible for the retaining element to also be slidably supported on the piston rod and to have at least one axial through-hole. In an embodiment of this kind, it is possible to do without a complex connection between the piston bottom element and the sealing element.

In both cases mentioned, the sealing element can have a rectangular cross section and can be formed as what is known as a rectangular ring element.

Moreover, in a further preferred embodiment, the piston rod can have a reduced circumference in the axial region thereof between the termination element and the sleeve element. In this way, it is possible for the damping unit according to the invention to be formed in a particularly compact manner, since in this case the piston rod can be formed so as to be comparatively thin, with the result that it is possible to avoid enlarging the cylinder.

In a particularly simple embodiment, the termination element can be formed by a nut, which can further reduce the production costs of the damping unit according to the invention, by making use of prefabricated components.

Depending on the field of application of a damping unit it may, in addition or alternatively, be necessary or desirable for a reduced damping force to act on the piston rod after a predetermined insertion distance into the cylinder. In the prior art, this object is achieved in that axial recesses or grooves are provided in the inside wall of the cylinder, although the substantially circular inside cross section of the cylinder is still retained. In this case, the grooves function as bypass channels for the damping fluid so that, during insertion, the piston bottom is subjected to reduced resistance in the region of the grooves in the cylinder, since the damping fluid can flow past said piston bottom through the grooves. However, large flow cross sections for the damping fluid are required in order to sufficiently reduce the damping force using this mechanism, which necessarily leads to the need for the grooves to reach into the material of the cylinder relatively far from the inside wall of the cylinder. As a result, the structure of the cylinder is weakened. It may therefore be necessary to provide thicker walled cylinders, which can lead to increased costs and an increased space requirement for the damping unit. Moreover, edges may be present at the transitions between the inside wall of the cylinder and the grooves, at which edges pressure peaks may occur, for example in the event of a transverse load. This phenomenon, too, can structurally weaken the damping unit.

In order to overcome the mentioned disadvantages of known damping units, according to a second aspect of the invention, for which protection is also sought independently of the first aspect of the invention, a damping unit is provided which comprises: a cylinder filled with a damping fluid, a piston rod which is guided in an axial direction of the cylinder so as to be able to be inserted and withdrawn, and a piston which is arranged on the piston rod and touches an inside wall of the cylinder, wherein the cylinder comprises an axial portion in which the inside wall of the cylinder has a cross section in the shape of a polygon having outwardly curved edges and rounded corners.

The design according to the invention of the inside wall of the cylinder constitutes an optimisation compared with the grooves known from the prior art in a number of respects. First, the outwardly curved edges of the polygon ensures good guidance of the piston since, in contrast with the prior art, no edges are present at which pressure peaks may occur. At the same time, the shape according to the invention of the inside wall of the cylinder makes it possible to provide a flow cross section for the damping fluid which is much larger, relative to the cylinder diameter, than that which could be provided by grooves. This contributes to making it possible to keep the overall size of the cylinder compact. Moreover, a cylinder having the inside wall shape according to the invention is also easier to produce compared with known damping units.

In an embodiment of the second aspect of the invention, the piston can have a substantially circular periphery when viewed axially, the periphery of the piston substantially corresponding to an inscribed circle of the polygon. In this way, a piston having a peripheral shape which is known per se and is advantageous can be guided in a stable and low-friction manner on the outwardly curved edges of the polygon.

Moreover, in a damping unit according to the second aspect of the invention, the piston can have a substantially circular periphery when viewed axially, wherein the cylinder comprises a first axial portion in which the inside wall of the cylinder has a circular cross section having substantially the same periphery as the piston, and the cylinder comprises a second axial portion in which the inside wall of the cylinder has a cross section in the shape of a polygon having outwardly curved edges and rounded corners, the periphery of the piston substantially corresponding to an inscribed circle of the polygon. A damping unit of this kind, then, in particular permits different damping characteristics depending on the insertion path of the piston rod, i.e. depending on the relative location between the piston rod and the cylinder. When using the damping unit for controlling a flap movement, the damping characteristic can depend on the flap adjustment (for example the opening angle or the position of the flap). A comparable effect can be achieved if the piston has a predetermined peripheral shape which is different from a circle, and the first axial portion of cylinder has a cross sectional shape on the inside wall which is adapted to the predetermined peripheral shape of the piston and, in the second axial portion of the piston, the inside wall of the cylinder is tangent in two or more delimited portions. In general, it should be noted at this point that, within the meaning of the present disclosure, in all aspects of the invention the term "cylinder" does not necessarily mean a circular cylinder, but rather includes any desired cross sectional shapes. In addition, although the outside wall of the cylinder is optionally circular, for example in order to facilitate assembly by means of standard fixings, the outside wall can also have any other desired cross sectional shape. The shape of the outer periphery can differ from the shape of the inner periphery of the cylinder, or can correspond to the shape of the inner periphery (constant wall thickness).

In a possible embodiment, the polygon can be a triangle, although polygons having more than three corners are also conceivable. Since, according to the second aspect of the invention, a damping unit is provided, the damping force of which is dependent on the amount by which the piston is inserted in the cylinder, in a development it can be conceivable, in particular in the first axial region of the cylinder, to provide the inside wall of the cylinder with at least one axial groove over at least some of the region. This measure permits a yet more precise adjustment in the dependency of the damping force on the current position of the piston rod, it being particularly expedient in the first axial region to merely provide grooves having a depth in the inside wall of the cylinder which is less than the depth of the corners of the polygon of the second axial region.

In a further preferred embodiment, it can be provided for an overall cross section of the at least one axial groove to decrease in the insertion direction of the piston rod. In this case, in the event of there being more than one groove at a predetermined axial position of the cylinder, the overall cross section is defined as the sum of the individual cross sections of the plurality of grooves. Alternatively, the overall cross section of the at least one axial groove can also increase in the insertion direction of the piston rod. By means of these two configurations, a progressive or degressive damping characteristic respectively of the damping unit is achieved with respect to the insertion path of the piston rod into the cylinder.

According to a third aspect of the invention, a damping assembly for a flap of a motor vehicle is provided.

For reasons of aerodynamics and for visual reasons, attempts have recently been made in vehicle construction, and in particular in automobile construction, to reduce the gap dimensions in the region of flaps (e.g. bonnets). However, there is a risk here that, when quickly closing the flap, the flap may touch or damage parts lying therebeneath, for example headlights, on account of the reduced gap dimensions.

In order to combat this risk, according to the invention a damping assembly for a flap of a motor vehicle is provided, which has a first damping force at a closure speed of the flap below a predetermined threshold value, and has a second damping force at a closure speed above the threshold value, which second damping force is greater than the first damping force. By providing a damping assembly of this kind, a controlled reduction in the closure speed of the flap makes it possible, by means of a variable damping force, to prevent the flap from closing too rapidly. The risk of the flap damaging adjacent components of the motor vehicle is thus eliminated.

In order to prevent the damping assembly from ultimately braking the flap so strongly at the end of the closure path that said flap no longer drops securely into its lock, it can be provided for the damping assembly to have a third damping force after a predetermined closure path, which third damping force is smaller than the first and the second damping force. In this development, the damping force is consequently dependent both on the speed of the closure movement of the flap and on the path traveled by the flap. In this way, an excellent degree of flexibility in controlling the closure movement of the flap is achieved by just one damping assembly.

In particular, the damping assembly according to the invention can comprise a damping unit according to the first and/or second aspect of the invention.

The piston rod can have a flap stop at the end thereof opposite the piston, which stop is designed to come into contact with the flap during the closure movement of the flap, such that the flap transmits an axial force to the flap stop in an insertion direction of the piston rod into the cylinder. A damping assembly of this kind achieves the advantage that the length of the damping assembly does not have to be designed so as to represent the entire movement path of the flap, but merely the region in which damping by the damping assembly is desired. The flap can thus be moved in a manner free of the effect of the damping assembly, i.e. uncoupled from the damping assembly, over a portion of the entire movement region, and the flap comes into bearing contact with the flap stop and begins to push the piston rod into the cylinder only at a specified point during the closure movement of the flap, said movement region of the flap then being controlled by the damping characteristics of the damping assembly. The fourth aspect of the invention, described in the following, claims independent protection for this principle of partial uncoupling between the flap and the damping assembly.

According to the fourth aspect of the invention, in order to achieve the above-mentioned object, a flap assembly is provided, comprising a frame of a motor vehicle, a flap which is attached to the frame so as to be movable between an open position and a closed position, and a damping assembly of the kind mentioned above, the cylinder of which is fastened or intended to be fastened to the frame or to the flap, wherein the flap can be moved from the open position over a first partial path region in a manner substantially uncoupled form the damping assembly until the flap strikes the flap stop, and the flap can subsequently be moved over a second partial path region into the closed position and pushing the piston rod into the cylinder in the process. A preferred usage example for a flap assembly of this kind is a bonnet assembly of a motor vehicle, the damping assembly in particular controlling the closure of the bonnet. In a first partial path region of the bonnet from the fully open position to an intermediate position between the open and the closed position, the bonnet is substantially uncoupled from the damping assembly, i.e. a movement of the bonnet does not lead to a relative movement between the piston rod and the cylinder. In the intermediate position (which can be at an opening angle of less than 30, preferably less than 15 degrees, i.e. in the region of the closed position), the bonnet then strikes the flap stop and the closure movement is damped. This means that the bonnet is prevented from slamming shut, and the bonnet is cushioned by the damping assembly. In this portion, the damping by the damping assembly is relatively great and can in particular react to the high speed of the falling bonnet with correspondingly high damping force. Preferably, the damping assembly is configured such that, in a final path region shortly before the complete closure of the flap, the damping force is further reduced by a predetermined amount, such that a specified minimum speed of the bonnet (for example due to the gravitational force thereof) is guaranteed, which ensures secure closing of the bonnet in the closure mechanism.

The invention will be described in more detail in the following, on the basis of an embodiment and with reference to the accompanying drawings, in which.

Figure 1:
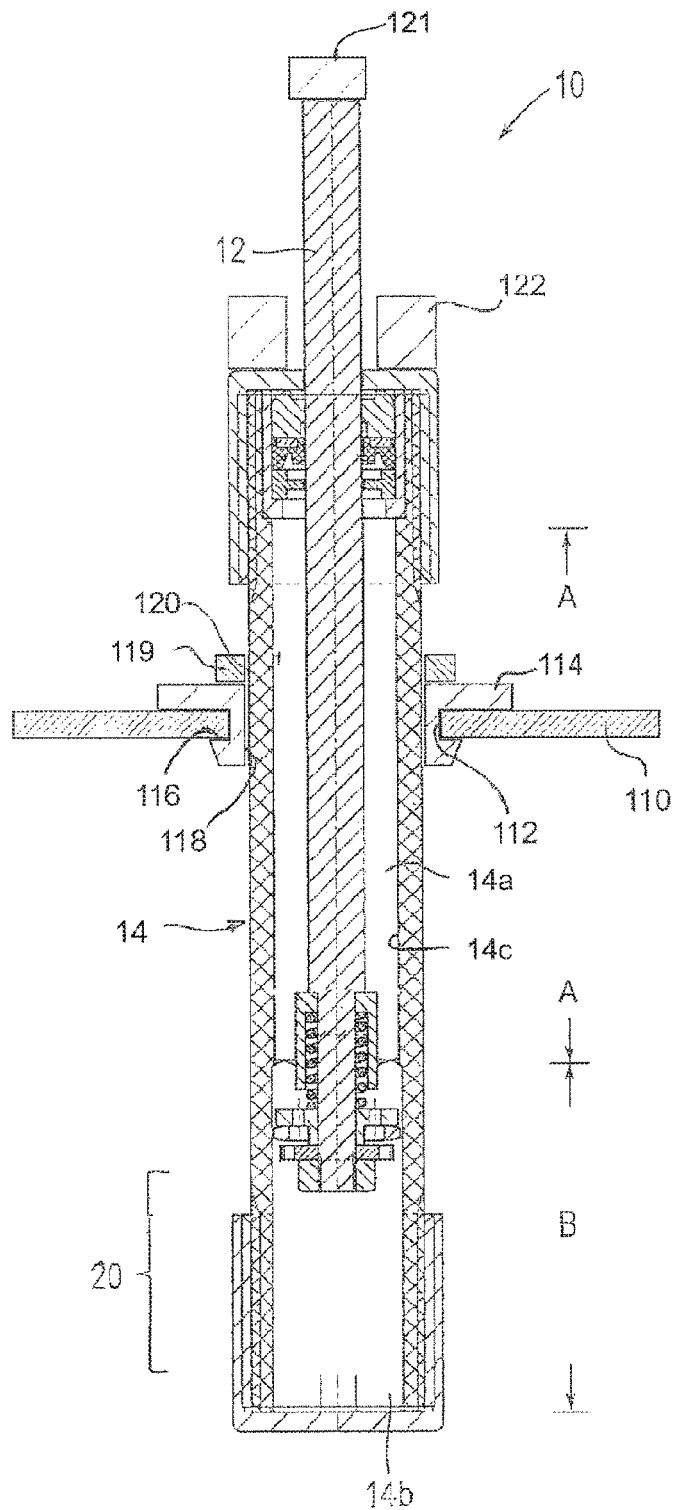
FIG. 1 is a longitudinal section through a damping unit according to the invention in a first variant of the embodiment.

In FIG. 1, a damping unit according to the invention is denoted generally as 10 and comprises a piston rod 12 and a cylinder 14 having a substantially circular cross section. The piston rod 12 is inserted into the cylinder 14 in the region shown at the top in FIG. 1, bearing elements and sealing elements which are known per se being provided, which elements will not be described in detail here. Regarding the shape of the inside wall 14c thereof, the cylinder 14 substantially comprises two portions, A and B, which will be described later on the basis of FIG. 3. A damping fluid, preferably a hydraulic fluid, is located in the interior of the cylinder 14, the interior of the cylinder 14 being divided into a first region 14a and a second region 14b by means of a piston bottom assembly which is denoted generally by reference sign 20 in FIG. 1.

The damping unit 10 can be used in various fields of application, and in particular a use for damping the closure movement of a flap of a motor vehicle (not shown) is conceivable, in which case the cylinder 14 would be connected to the body of the vehicle and the piston rod 12, received in a slidable manner in the cylinder, would either be directly connected to the flap or would come into contact with said flap during a closure movement thereof. Alternatively, the cylinder 14 could be connected to the flap and the piston rod 12 could be attached to the vehicle body or comprise a stop for making contact with the vehicle body when the flap is closed.

FIG. 1 shows a variant of a flap assembly, in which the cylinder 14 is mounted on a vehicle body 110 shown only in regions in FIG. 1 (a vehicle body panel is shown in cross section), in particular inserted in a mounting opening 112 in the vehicle body 110 and fastened there by a fastening element 114. A ring element made of a resilient material can be used as the fastening element 114, which ring element is resiliently compressible for mounting and expands after being pushed into the mounting opening 112 and interlocks in a clip-like manner, having undercuts 116, behind the panel of the vehicle body 110. The annular fastening element 114 can for example have at least one slot which permits the diameter of the ring to be reduced against the resilient restoring force of the material of the fastening element 114 in order to clip the fastening element 114 into the mounting opening 112.

A thread 118 on an inner periphery of the fastening element 114 can engage in an external thread 120 provided on the outer periphery of the cylinder 14, such that the cylinder 14 can be screwed into the fastening element 114 and thus attached to the vehicle body 110. Moreover, the threaded engagement 118, 120 can permit vertical adjustment of the damping unit for fine-tuning the stop position of the flap assembly. If desired, a set relative length between the cylinder 14 and the fastening element 114 can be fixed by a lock nut 119 which is likewise in threaded engagement in the external thread 120 of the cylinder 14 and is screwed against the fastening element 14.

As an additional advantage, the fastening element 114 can be configured such that the cylinder 14 screwed into the fastening element 114 blocks a compression and thus reduction in diameter of the annular fastening element 14, with the result that the undercuts 116 prevent, in an effective manner, inadvertent release of the fastening element 114 and thus also of the damping unit 10 from the vehicle body panel of the vehicle body 110. Other variants familiar to a person skilled in the art for fastening the cylinder 14 to the vehicle body 110 are conceivable, for example by means of clamping engagement of by means of a welded or adhesive joint.

A first flap stop 121 is provided on an end of the piston rod 12 protruding from the cylinder 14, against which stop the flap strikes during its closure movement. The first flap stop can be designed to reduce noise, and a first shock absorber can be formed by resilient cushioning, for example rubber cushioning.

In addition or as an alternative to the first flap stop 121, a second flap stop 122 can be arranged on a front side of the cylinder 14 at which the piston rod 12 protrudes from the cylinder 14. The second flap stop 122 can be used to fix an end point of the flap movement and to finally fully support the flap in the completely closed state, such that this load need not be absorbed by either the closure mechanism of the flap or the piston rod 12, but rather can be directly introduced into the vehicle body 110 via the cylinder 14.

The second flap stop 122 can be formed by an attachment made of a resilient material, for example a rubber buffer. In the variant shown in FIG. 1, the second flap stop 122 is mounted directly, for example glued, on the front side of the cylinder 14. In an alternative variant shown in FIG. 2, the second flap stop 122 has a buffer body 122a which surrounds the piston rod 12 and is axially movable along the piston rod 12, the buffer body 122a having an external thread which is engaged in an internal thread of a nut 122b fastened on the front side of the cylinder 14. The position of the buffer body 122a can be adjusted in the axial direction by rotating the buffer body 122a relative to the nut 122b, such that a bearing surface 124 of the buffer body 122a facing away from the cylinder 14 can be adjusted in the axial position thereof relative to the cylinder 14.

Figure 3:
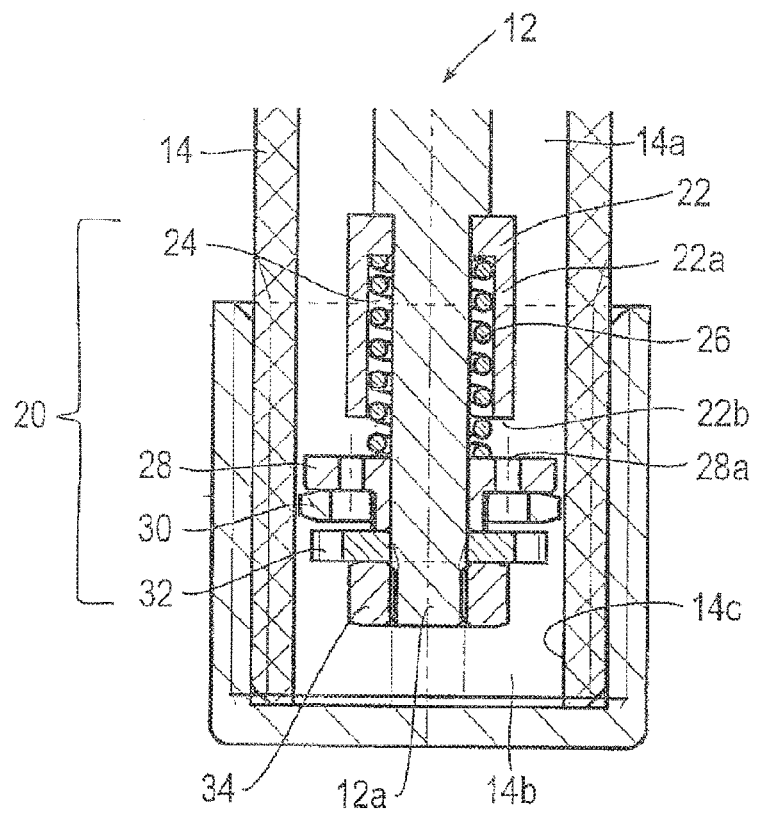
FIG. 3 is an enlarged view of the region of the piston bottom of the damping unit from FIG. 1.
Figure 4:
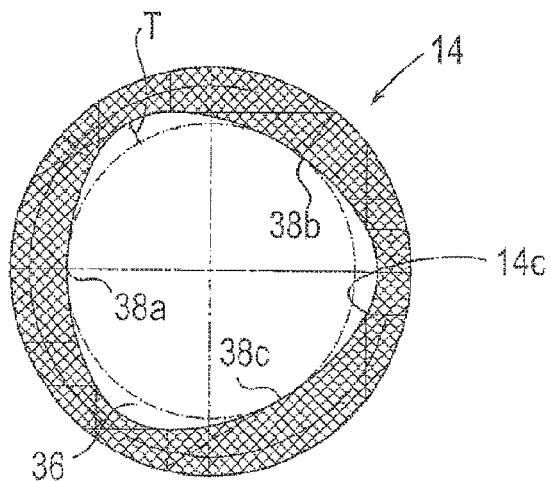
FIG. 4 is a cross section through a cylinder of a damping unit according to the invention, in a region in which the inside wall of the cylinder has a polygonal shape.

FIG. 3 is an enlarged view of the region of the piston bottom assembly 20 from FIG. 1. The piston bottom assembly 20 is located at the front end of the piston rod 12 when viewed in the insertion direction of said piston rod 12 into the cylinder 14. In this region, the piston rod 12 has a portion having a reduced periphery 12a, on which a sleeve element 22 is arranged (mounted or rigidly provided) on the piston rod 12, which sleeve element has a casing 22a which is spaced apart from the piston rod 12 and is open in the insertion direction of the piston rod 12 into the cylinder 14. A chamber 24 is thereby defined between the casing 22a of the sleeve element 22 and the piston rod 12. In addition, a front face 22b is defined on the open end of the casing 22a of the sleeve element 22. A spiral spring 26 is received in the chamber 24, which spring interacts with the sleeve 22 and a piston bottom element 28 which is supported on the piston rod 12 so as to be axially slidable.

Figure 2:
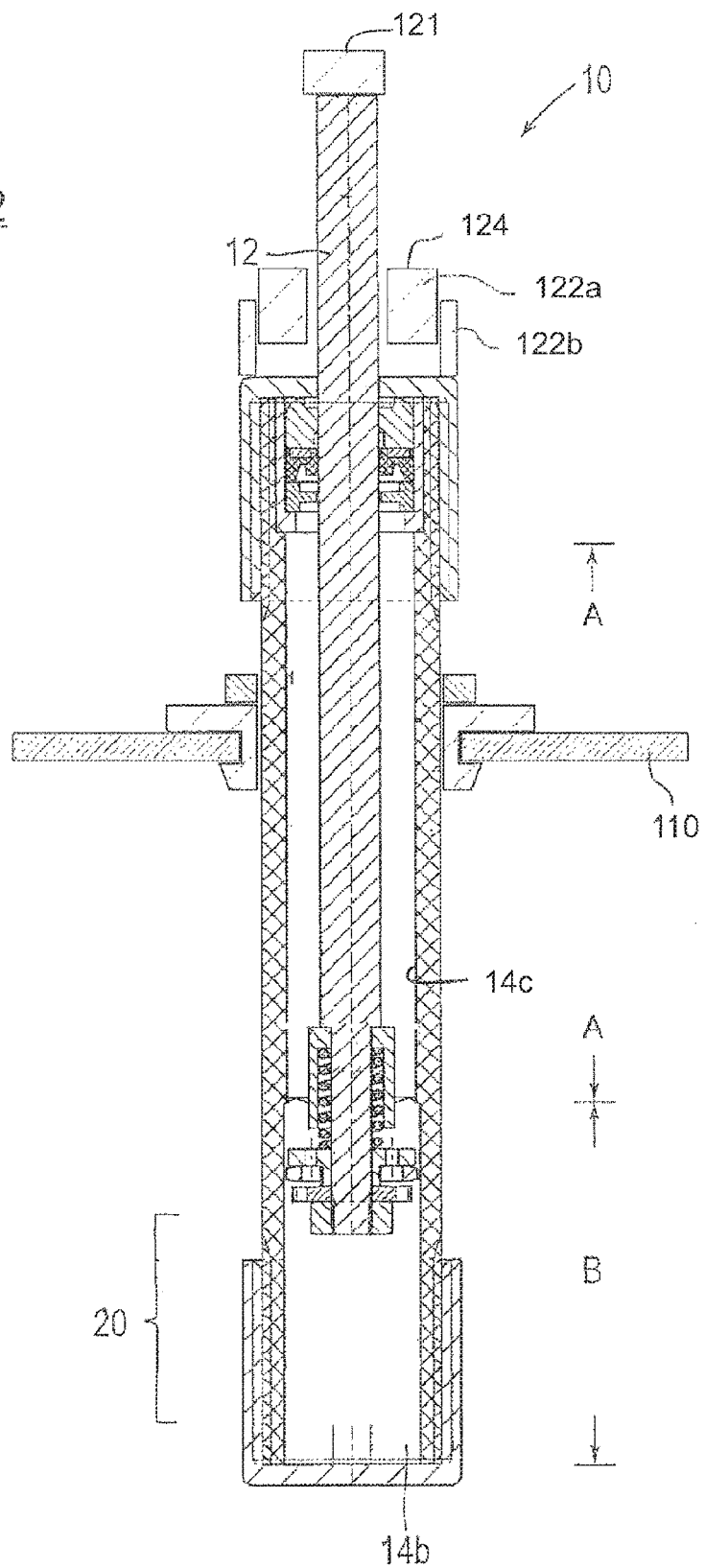
FIG. 2 shows a second variant in which an alternative option for the design of the second flap stop is shown.

In FIG. 1 to 3, the piston rod 12 is idle or is in the process of being withdrawn from the cylinder 14. In these two states, the piston bottom element 28 is spaced apart from the sleeve 22 in the first portion 14a of the interior of the cylinder 14 due to the effect of the spiral spring 26 and/or due to the dynamic pressure of the damping fluid. The piston bottom element 28 shown has a plurality of axial through-holes 28a through which damping fluid can flow from the first region 14a into the second region 14b of the interior of the cylinder 14 and vice versa. The piston bottom element 28 is associated with a sealing element 30 which provides a seal between the piston bottom element 28 and the inside wall 14c of the cylinder 14. In the embodiment shown, the sealing element 30 is formed by an annular element having a rectangular or trapezoid cross section, which can be manufactured from a suitable plastics material for example. In the embodiment shown, the sealing element 30 is not rigidly connected to the piston bottom element 28, but rather is merely supported thereon in one direction and is supported by a retaining plate element 32 in the other direction. Both the sealing element 30 and the retaining plate element 32 are provided so as to have sufficient axial through-holes to produce only low resistance to the flow of the damping fluid compared with the piston bottom element 28. A termination element 34 is provided, on the front end of the piston rod 12, for example screwed to the piston rod 12 in the manner of a nut, in order to thus fix the elements of the piston bottom assembly 20 to the piston rod.

As already mentioned, the state shown in FIG. 1 and FIG. 2 is the state in which the piston rod 12 is currently either idle or being moved out of the cylinder 14. If, in contrast, the piston rod 12 is currently being inserted into the cylinder 14, the damping fluid in the second region 14b of the interior of the cylinder 14 causes a dynamic pressure to be exerted on the retaining plate element 32, the sealing element 30 and the piston bottom element 28, which leads to a force which presses the components mentioned towards the sleeve element 22. If the insertion speed of the piston rod 12 into the cylinder 14 is above a threshold determined by the spring rate of the spiral spring 26, the force exerted on the piston bottom element 28 by the dynamic pressure exceeds the opposing force of the spiral spring 26. In this case, the spiral spring 26 is compressed and the piston bottom element 28 slides along the piston rod 12 towards the sleeve element 22 until it comes into contact with the front face 22b of the sleeve element 22. In this state, the front face 22b overlaps with the through-holes 28a in the piston bottom element 28 at least in part. As a result, the effective flow cross section available to the damping fluid for flowing from the second region 14b to the first region 14a of the interior of the cylinder 14 is reduced. This leads to increased hydraulic resistance and thus to an increased damping force of the damping unit 10. By appropriately selecting the spring rate of the spiral spring 26, it is possible to select the value of the insertion speed of the piston rod 12 into the cylinder 14 above which the described change in the damping force of the damping unit 10 occurs. In this way, a progressive damping characteristic of the damping unit 10 with regard to the insertion speed of the piston 12 is achieved by simple means.

FIG. 3 is a cross section of the cylinder 14 in a region in which the inside wall 14c of the cylinder 14 is in the shape of a polygon having outwardly curved edges and rounded corners. In the example shown in FIG. 3, the polygon is a triangle. In addition, a dashed line shows a contour of the piston bottom element 28 and/or the sealing element 30 which, in this case, are circular. The maximum extent of the polygon with respect to the circular contour of the piston bottom element 28 and/or the sealing element 30 in the region of the rounded corners of the polygon is denoted as the depth T in FIG. 3.

Due to the selected shape of the inside wall 14c of the cylinder 14, regions 36 are provided between the contour of the piston bottom element 28 and/or the sealing element 30 and the inside wall 14c of the cylinder 14, through which regions the damping fluid can flow past the piston bottom element 28 and the sealing element 30 when the piston rod 12 is inserted in the cylinder 14. In addition, three guide points 38a to 38c are provided symmetrically, at which points the piston bottom element 28 and/or the sealing element 30 can be in contact with and supported on the inside wall 14c of the cylinder. The selected polygonal shape having outwardly curved edges permits advantageous support of the piston bottom element 28, for example in the event of a transverse load on the piston rod 12. At the same time, the flow cross section of the regions 36 is relatively large compared with the diameter of the cylinder 14. Thus, the embodiment shown provides, in a compact structure, a large bypass cross section for the damping fluid and simultaneously advantageous support of the piston bottom element 28 in the case of transverse loads, sharp edges being avoided in addition, at which edges pressure peaks could potentially occur in the event of a load.

The cross sectional profile of the inside wall 14c of the cylinder 14 shown in FIG. 3 can be used in particular in the region marked B in FIG. 1 in the damping unit 10 according to the invention, whereas in region A the cross sectional profile of the inside wall 14c of the cylinder 14 substantially corresponds to the outer periphery of the piston bottom element 28 and/or of the sealing element 30. In this way, during insertion of the piston rod 12 into the cylinder 14, the damping force is significantly reduced in the second portion B of the insertion path, since the damping fluid can flow around the piston bottom element 28 and the sealing element 30 over a large surface area. In this way it can be ensured, for example in the case of a damped closure movement of a flap of a motor vehicle, that the flap still drops securely into its lock even if, in contrast, the closure movement of said flap is intended to be damped in order to prevent possible damage to adjacent parts due to too rapid a closure.

The invention claimed is:

1. Damping unit comprising:
a cylinder which is filled with a damping fluid and in which a piston rod is guided in an axial direction of the cylinder so as to be able to be inserted and withdrawn, the piston rod being associated with a bottom surface which extends between the piston rod and an inside wall of the cylinder and has at least one axial through-hole which defines an effective flow cross section for the damping fluid;
wherein the piston rod comprises, at the front end thereof in the insertion direction into the cylinder:
a stop which is fixed on the piston rod in the axial direction and defines a front face in the insertion direction of the piston rod;
a piston bottom element which is supported on the piston rod so as to be axially slidable and comprises the bottom surface;
a resilient element which prestresses the piston bottom element relative to the piston rod in such a way that, in an idle state of the piston rod, the bottom surface of the piston bottom element and the front face of the stop are spaced apart from each other by means of the effect of the resilient element; and
the resilient element being designed such that, above a predefined insertion speed of the piston rod into the cylinder, the dynamic pressure of the damping fluid causes the bottom surface of the piston bottom element to come into contact with the front face of the stop against the effect of the resilient element, and the effective flow cross section for the damping fluid being reduced due to the interaction of the front face of the stop and the at least one axial through-hole in the bottom surface of the piston bottom element,
wherein the piston bottom element is associated with a sealing element which produces a seal between the piston bottom element and the inside wall of the cylinder, and further wherein the sealing element is formed separately from the piston bottom element and is received between the piston bottom element and a retaining element, the retaining element being slidably supported on the piston rod and comprising at least one axial through-hole.

2. Damping unit according to claim 1, wherein the stop is formed by a sleeve element which has a casing which extends substantially in the axial direction, is spaced apart from the piston rod, and is open in the insertion direction of the piston rod, such that a chamber is formed between the piston rod and the casing, and the front face of the stop being defined on the open end of the casing in the insertion direction of the piston rod, the resilient element being received in the chamber formed between the piston rod and the sleeve element at least in part so as to be supported on the sleeve element at one end and on the piston bottom element at the other end.

3. Damping unit according to claim 1, wherein a termination element is provided which is fixed on the piston rod in the axial direction and forms an indirect or direct stop for the piston bottom element in the insertion direction of the piston rod.

4. Damping unit according to claim 1, wherein the piston rod has a region having a reduced circumference in the axial region thereof between the termination element and the sleeve element.

5. Damping unit according to claim 1, wherein the termination element is formed by a nut which is screwed onto the piston rod.

6. Damping unit according to claim 1,
wherein
the cylinder comprises an axial portion in which the inside wall of the cylinder has an entirely concave cross sectional shape formed of a plurality of outwardly curved edges alternatively connected by rounded corners.

7. Damping unit according to claim 6, wherein the piston has a substantially circular periphery when viewed axially, the periphery of the piston substantially corresponding to an inscribed circle of the cross sectional shape of the inside wall of the cylinder.

8. Damping unit according to claim 7, wherein the cylinder also comprises further axial portion in which the inside wall of the cylinder has a circular cross section having substantially the same periphery as the piston.

9. Damping unit according to claim 6, wherein the cross sectional shape of the inside wall of the cylinder has three rounded corners.

10. Damping assembly for a flap of a motor vehicle, comprising a damping unit according to claim 1, wherein the damping assembly has a first damping force at a closure speed of the flap below a predetermined threshold value and has a second damping force at a closure speed above the threshold value, which second damping force is greater than the first damping force.

11. Damping assembly according to claim 10, wherein the damping assembly has a third damping force in the case of a closure movement after a predetermined closure path, which third damping force is smaller than the first and the second damping force.

12. Damping assembly according to claim 10, wherein the piston rod has a flap stop at the end thereof opposite the piston bottom element, which stop is designed to come into contact with the flap during the closure movement of the flap, such that the flap transmits an axial force to the flap stop in an insertion direction of the piston rod into the cylinder.

13. Flap assembly comprising a frame of a motor vehicle, a flap which is attached to the frame so as to be movable between an open position and a closed position, and a damping assembly according to claim 12, the cylinder of which is fastened or intended to be fastened to the frame or to the flap, wherein the flap can be moved from the open position over a first partial path region in a manner substantially uncoupled from the damping assembly until the flap strikes the flap stop, and in that the flap can subsequently be moved over a second partial path region into the closed position and pushes the piston rod into the cylinder in the process.

14. Damping unit according to claim 1, wherein the sealing element has a rectangular cross section.

* * * * *